United States Patent
Rayne

(10) Patent No.: US 12,398,701 B2
(45) Date of Patent: Aug. 26, 2025

(54) CONVECTION-DRIVEN POWER GENERATOR

(71) Applicant: Damian Rayne, London (GB)

(72) Inventor: Damian Rayne, London (GB)

( * ) Notice: Subject to any disclaimer, the term of this patent is extended or adjusted under 35 U.S.C. 154(b) by 0 days.

(21) Appl. No.: 17/921,403

(22) PCT Filed: Apr. 27, 2021

(86) PCT No.: PCT/EP2021/060961
§ 371 (c)(1),
(2) Date: Oct. 26, 2022

(87) PCT Pub. No.: WO2021/219623
PCT Pub. Date: Nov. 4, 2021

(65) Prior Publication Data
US 2023/0132257 A1    Apr. 27, 2023

(30) Foreign Application Priority Data
Apr. 29, 2020 (GB) ...................................... 2006297

(51) Int. Cl.
*F03G 6/04*    (2006.01)
*F03D 9/00*    (2016.01)
(Continued)

(52) U.S. Cl.
CPC ............. *F03G 6/045* (2013.01); *F03D 9/007* (2013.01); *F03D 9/37* (2016.05); *F03G 6/04* (2013.01);
(Continued)

(58) Field of Classification Search
CPC ... F03D 9/007; F03D 9/35; F03D 9/37; F03G 6/04; F03G 6/045; F03G 6/06;
(Continued)

(56) References Cited

U.S. PATENT DOCUMENTS

| 3,970,409 A | 7/1976 | Luchuk |
| 4,016,725 A * | 4/1977 | Fiss .......................... F01K 13/00 |
| | | 261/DIG. 11 |

(Continued)

FOREIGN PATENT DOCUMENTS

| CN | 106321361 A | 1/2017 | |
| DE | 102006024341 A1 * | 12/2007 | ............... F03D 1/04 |

(Continued)

OTHER PUBLICATIONS

International Search Report and Written Opinion for International Patent Application No. PCT/EP2021/060961, dated Sep. 22, 2021, 19 pages.

*Primary Examiner* — Mark A Laurenzi
*Assistant Examiner* — Xiaoting Hu
(74) *Attorney, Agent, or Firm* — Dorsey & Whitney LLP

(57) ABSTRACT

A convection-driven power generator comprising a flow intake configured to supply fluid to the generator, a flow duct having a duct inlet and a duct outlet wherein the duct outlet is spaced downstream from the duct inlet along the flow duct, the duct inlet being fluidly coupled to the flow intake. A heating chamber fluidly is coupled to the duct outlet so as to receive fluid from the duct outlet, the heating chamber comprising an external wall configured to transmit light radiation incident thereon such that fluid within the heating chamber is heated by the transmitted light radiation. A flow exhaust is fluidly coupled to the heating chamber and configured to exhaust fluid heated by the heating chamber from the heating chamber. A turbine is arranged within the flow duct, downstream of the flow intake, and exposed to fluid flow through the flow duct such that when fluid flows through the flow duct the turbine is caused to rotate by the fluid flow; and at least one lens element is configured to (Continued)

focus the light radiation transmitted by the external wall within the heating chamber.

18 Claims, 7 Drawing Sheets

(51) Int. Cl.
 *F03D 9/37* (2016.01)
 *F03G 6/06* (2006.01)
(52) U.S. Cl.
 CPC ........ *F03G 6/062* (2021.08); *F05B 2240/131* (2013.01); *F05B 2240/133* (2013.01); *F05B 2260/24* (2013.01)
(58) Field of Classification Search
 CPC .... F03G 6/062; F03G 6/063; F05B 2240/131; F05B 2240/133; F05B 2260/24; F24S 2080/503
 See application file for complete search history.

(56) References Cited

U.S. PATENT DOCUMENTS

| | | | | |
|---|---|---|---|---|
| 4,224,528 A | * | 9/1980 | Argo | F03D 15/10 290/55 |
| 4,355,628 A | * | 10/1982 | Watts | F24S 23/71 126/609 |
| 6,772,593 B2 | * | 8/2004 | Dunn | F03D 9/007 60/641.11 |
| 2004/0206086 A1 | | 10/2004 | Kim | |
| 2005/0169742 A1 | | 8/2005 | Kane | |
| 2007/0225143 A1 | | 9/2007 | Kim et al. | |
| 2008/0156317 A1 | | 7/2008 | Yangpichit | |
| 2009/0212570 A1 | | 8/2009 | Le et al. | |
| 2010/0003636 A1 | | 1/2010 | Wagner | |
| 2010/0034636 A1 | | 2/2010 | Tsou | |
| 2011/0173980 A1 | | 7/2011 | Yangpichit | |
| 2012/0321454 A1 | * | 12/2012 | Yu | F03D 1/04 415/191 |
| 2019/0186473 A1 | * | 6/2019 | Al-Sulaiman | F03G 6/045 |
| 2019/0249749 A1 | | 8/2019 | Maiullo | |
| 2021/0091634 A1 | | 3/2021 | Nash | |

FOREIGN PATENT DOCUMENTS

| | | | | |
|---|---|---|---|---|
| EP | 1423607 B1 | * | 12/2006 | ............... F03D 1/04 |
| GB | 2471710 A | | 1/2011 | |
| KR | 102188888 B1 | | 12/2020 | |
| WO | 9711272 A1 | | 3/1997 | |
| WO | 2006098662 A2 | | 9/2006 | |
| WO | WO-2011120531 A1 | * | 10/2011 | ............. F03G 6/045 |
| WO | WO-2018046979 A1 | * | 3/2018 | ............. F03G 6/045 |

* cited by examiner

CONVECTION-DRIVEN POWER GENERATOR

CROSS-REFERENCE TO RELATED APPLICATIONS

This application is the national stage application of International Patent Application No. PCT/EP2021/060961 filed on Apr. 27, 2021 and entitled "A Convection-Driven Power Generator", which claims priority to Great Britain Patent Application No. 2006297.2, filed on Apr. 29, 2020 and entitled "A Convection-Driven Power Generator", the entire contents of which are hereby incorporated by reference herein in their entireties.

The present invention relates to a convection-driven power generator and to a turbine.

Existing power generators are heavy, difficult to transport and are complicated, requiring regular maintenance with many moving parts. Furthermore, many use fossil fuels and so are not particularly environmentally friendly as their operation causes harmful greenhouse gasses to be released into the environment. This also limits the environments in which they can be used or else measures must be taken for fume extraction.

There therefore exists a need for an alternative power generator which is simple in design and operation, low weight, robust, easy to transport and assembly, produces a very low level of noise, and, in embodiments which generate power from sunlight, is less sensitive to the height of the sun in the sky and so is capable of providing power during extended lengths of time Such a power generator lends itself particularly to being used in remote locations or in developing countries.

The present invention aims to alleviate, at least to a certain extent, the problems and/or address at least to a certain extent the difficulties associated with the prior art.

According to a first aspect of the present invention, there is provided a convection-driven power generator comprising:
  a flow intake configured to supply fluid to the generator;
  a flow duct having a duct inlet and a duct outlet wherein the duct outlet is spaced downstream from the duct inlet along the flow duct, the duct inlet being fluidly coupled to the flow intake;
  a heating chamber fluidly coupled to the duct outlet so as to receive fluid from the duct outlet, the heating chamber comprising an external wall configured to transmit light radiation incident thereon such that fluid within the heating chamber is heated by the transmitted light radiation;
  a flow exhaust fluidly coupled to the heating chamber and configured to exhaust fluid heated by the heating chamber from the heating chamber;
  a turbine arranged within the flow duct, downstream of the flow intake, and exposed to fluid flow through the flow duct such that when fluid flows through the flow duct the turbine is caused to rotate by the fluid flow; and
  at least one lens element configured to focus the light radiation transmitted by the external wall within the heating chamber.

Thus, the flow intake may optionally be configured to supply fluid to the flow duct, for example from the external environment (i.e. from the fluid environment surrounding the generator, e.g. the surrounding air). Thus, the flow duct may optionally be configured to receive fluid from the external environment via the flow intake. The term external wall is meant as a wall of the heating chamber (that is, forming a part of the heating chamber itself, and therefore a part of the generator itself) which defines a fluid boundary between the generator and the external environment: thus the external/ambient fluid environment is on one side of the wall (the external side of the external wall). Optionally, the turbine is upstream of the duct outlet.

Optionally, the convection-driven power generator is configured such that, when fluid is heated within the heating chamber by the transmitted light radiation, the heated fluid is caused to flow through the flow exhaust via convection (e.g. predominately or solely by convection) and thereby establishes a fluid current within the flow duct which causes fluid to enter the duct inlet and in turn to enter the generator through the flow intake. Thus, the transmitted light radiations established a fluid current or flow down the fluid duct.

Optionally, the lens element is configured to substantially focus the transmitted light radiation to an area, locus or point which is within the heating chamber but spaced away from all interior surfaces thereof such that the focused light radiation directly heats the fluid with the heating chamber, e.g. fluid within an internal fluid heating space of the heating chamber. Optionally, the lens element is configured to substantially focus the transmitted light radiation to an area, locus or point which is within the heating chamber but spaced away from all light-receiving surfaces thereof such that the focused light radiation directly heats the fluid with the heating chamber, e.g. fluid within an internal fluid heating space of the heating chamber. Optionally, the lens element is configured to substantially focus the transmitted light radiation to an area, locus or point which is within the internal fluid heating space of the heating chamber but spaced away from all light-receiving surfaces thereof such that the focused light radiation directly heats the fluid with the heating chamber, e.g. fluid within the internal fluid heating space of the heating chamber. Thus, the primary method of heat transfer from the light radiation to the fluid is not by conduction, e.g. from a light-absorbing surface, but instead the light is focused to a concentrated point or area to form a point or area of increased temperature which is spaced away from all light-receiving surfaces or other such internal surfaces of the heating chamber. This provides increased efficiency of heat transfer to the fluid as less heat is absorbed by any light-absorbing surfaces which may otherwise then be conducted away from the light-receiving surfaces into other parts or components of the generator and not directly to the fluid itself. Thus a more efficient generator is provided. Furthermore, directly heating the fluid itself is particularly advantageous as only a predetermined and relatively small area of fluid within the heating chamber is heated and so the surrounding fluid remains cooler and may act as a thermal insulation between the heated air and the surrounding components or surfaces of the convection-driven generator, reducing thermal losses, and therefore improving the thermal efficiency of the convection-driven generator.

Optionally, the lens element has a focal point or locus which is within the heating chamber but spaced away from all interior surfaces thereof such that the focused light radiation directly heats the fluid with the heating chamber, e.g. fluid within an internal fluid heating space of the heating chamber. Optionally, the lens element has a focal point or locus which is within the heating chamber but spaced away from all light-receiving surfaces thereof such that the focused light radiation directly heats the fluid with the heating chamber, e.g. fluid within an internal fluid heating space of the heating chamber. This provides increased efficiency of heat transfer to the fluid as less heat is absorbed by any light-receiving surfaces which may then be conducted away from the fluid into other parts or components of the generator and not directly to the fluid itself. Thus a more efficient generator is provided.

Optionally, the external wall of the heating chamber comprises the at least one lens element. Optionally, the external wall may be shaped so as to form the lens element, for example it may comprise one or more convex surfaces configured to act as a lens element, for example two back-to-back convex surfaces. Thus, the need for a separate lens element is avoided and the generator may be simpler in design and require fewer components.

Optionally, the convection-driven power generator further comprises a chimney, the chimney comprising the flow duct and, optionally, the chimney also comprising the flow intake. Optionally, the flow duct passes through the chimney, e.g. longitudinally through the chimney, i.e. down the chimney. Optionally, the chimney surrounds at least a portion of the flow duct, i.e. the chimney forms a flow duct housing. The chimney is generally or substantially vertically aligned in use and may also be referred to as a tower. Optionally, the flow intake is provided at the highest end of the chimney, that is the opposite end of the chimney to the duct outlet, when the chimney comprises the duct outlet. Optionally, the flow duct may be provided within the chimney.

Optionally, the heating chamber comprises an annulus extending therethrough, and wherein the flow duct, or a portion thereof, passes longitudinally through the annulus. Optionally the flow duct passes through generally the centre of the heating chamber, e.g. to thereby define a toroidal fluid heating space within the heating chamber, or to thereby define an annulus through which the flow duct passes longitudinally. Such an arrangement provides a particularly compact generator.

Optionally, the heating chamber comprises an annulus extending therethrough, and wherein the chimney, or a portion thereof, passes longitudinally through the annulus. Such an arrangement provides a particularly compact generator. Optionally, the annulus is generally at the centre of the heating chamber. Optionally, the flow duct outlet is arranged towards or at the bottom/base of the heating chamber, e.g. towards the bottom of the internal fluid heating space such that fluid received from the fluid duct enters the heating chamber or internal fluid heating space towards or at its bottom/base.

Optionally, the heating chamber is substantially or generally toroidal, wherein the annulus of the toroid is arranged substantially along the toroid axis of the heating chamber such that the heating chamber extends circumferentially around the flow duct. Such an arrangement provides a particularly compact generator. Optionally, the heating chamber is substantially or generally oblate toroidal.

Optionally, the annulus and/or flow duct and/or chimney is arranged in use such that its longitudinal axis is substantially or generally vertical. Such an arrangement provides a particularly compact generator.

Optionally, the flow exhaust extends peripherally around the chimney or flow duct.

Optionally, the flow exhaust is arranged in use above the heating chamber such that heated fluid is caused to exit the flow exhaust by convection (solely or predominately by convection).

Optionally, the external wall is made from plastic sheeting supported by a support structure, for example ribs, e.g. longitudinally and/or laterally extending ribs. Such a solution provides a lightweight means of supporting the plastic sheeting.

Optionally, the external wall comprises two light transmitting layers spaced from each other, for example by an air gap, configured such that incident light passes through both of the two layers. The gap between the two layers provides a lighter external wall as well as functioning as a thermal insulating later between the two layers, thereby reducing thermal losses and improving the efficiency of the generator.

Optionally, the two layers of the external wall are arranged with respect to each other so as to form the lens element. Thus, the external wall may comprise or form the lens element, reducing the number and complexity of parts required.

Optionally, the flow duct comprises a convergent-divergent nozzle for accelerating the fluid flow, the turbine being provided within the nozzle, for example at the throat of the nozzle. The nozzle therefore accelerates the fluid flow such that it is fast enough to rotate the turbine to above the turbine stall speed. Such a configuration enables the turbine to rotate even when the incident light is so weak as to only generate a weak flow through the flow duct.

Optionally, the flow intake comprises a variable flow restrictor configured to vary the fluid flow rate flowable through the generator. Optionally, the flow intake comprises a variable flow restrictor configured to vary the fluid flow rate flowable through the fluid duct. Thus, the flow restrictor may be configured to vary the power output of the generator by varying the fluid flow rate through the flow duct and thereby through the generator.

Optionally, the variable flow restrictor is configured to vary the cross-sectional area of the flow intake so as to control the fluid flow rate flowable through the generator.

Optionally, the variable flow restrictor comprises a collar or plug which is axially moveable with respect to the flow duct or chimney so as to vary the cross-sectional area of the flow intake and thereby control the fluid flow rate flowable through the generator.

Optionally, the flow exhaust comprises a variable flow restrictor configured to vary the cross-sectional area of the flow exhaust so as to control the rate of fluid flow flowable through the generator. Optionally, the flow intake comprises a variable flow restrictor configured to vary the fluid flow rate flowable through the fluid duct. Thus, the flow restrictor may be configured to vary the power output of the generator by varying the fluid flow rate through the flow duct and thereby through the generator.

Optionally, the flow exhaust variable flow restrictor is pivotably mounted to the generator, for example to the chimney or heating chamber, such that pivoting the flow restrictor varies the cross-sectional are of the flow exhaust. Optionally, the flow exhaust variable flow restrictor comprises a collar or plug which is axially moveable with respect to the flow duct or chimney so as to vary the cross-sectional area of the flow exhaust and thereby control the fluid flow rate flowable through the generator.

Optionally, the fluid is air. Optionally the fluid is water.

Optionally, the external wall of the heating chamber is configured to transmit solar radiation incident thereon such that fluid within the heating chamber is heated, e.g. directly heated, by the transmitted solar radiation.

Optionally, the power generator is a light-electrical power generator configured to convert incident light radiation into electrical power.

Optionally, the turbine is operably connected to an electrical generator such that rotation of the turbine causes the electrical generator to generate electrical power. Optionally, the turbine is operably connected to the electrical generator by a shaft.

Optionally, the flow duct comprises stator blades arranged upstream of the turbine, the stator blades being configured to cause the flow to spiral down the flow duct before it passes through the axial turbine, for example the stator blades are configured to impart rotational momentum to the flow such that the flow is caused to rotate about the longitudinal axis of the flow duct as the fluid flows along the duct. The stator blades condition the air flow to impart rotation to the flow along the duct so as to more readily cause the turbine to rotate.

Optionally, the turbine comprises a chamber containing a viscous liquid, wherein the chamber is configured such that the viscous liquid is caused to flow radially outwards within the chamber through centrifugal acceleration of the viscous liquid upon rotation of the turbine. Optionally the chamber extends between 5% and 95% of the radius of the turbine, for example between about 10% and 90%, about 15% and 85%, about 20% and 80%, about 30% and 70%, about 40% and 60%, between 50% and 100% or any combination thereof, for example between 10% and 70%, or between 50% and 60%.

Optionally, the turbine is supported by magnetic bearings spaced apart from each other along the rotational axis of the axial turbine. Magnetic bearings reduce frictional losses.

Optionally, the external wall is substantially or generally arcuate, e.g. substantially or generally convex. Being substantially arcuate means that the external wall may act as a lens element.

Optionally, the lens element comprises a substantially or generally arcuate portion of the external wall.

Optionally, a portion of the flow duct downstream of the turbine arcuately flares radially outwards to form a generally or substantially conical shape, the end of the flared portion comprising the duct outlet being fluidly coupled to the heating chamber.

Optionally, flow intake is configured to receive fluid from the external environment, for example ambient air.

Optionally, the flow exhaust is configured to exhaust the fluid to the external environment, for example to the ambient air.

Optionally, the turbine is an axial turbine.

Optionally, the power generator is generally or substantially spherical or spheroid.

Optionally, the flow intake is arranged in use vertically higher than the flow exhaust.

Optionally, the power generator is substantially or generally symmetrical about the central vertical axis of the power generator, for example about the longitudinal axis of the flow duct.

According to a second aspect of the present invention, there is provided a turbine having an axis of rotation, the turbine comprising an internal fluid chamber for containing fluid, wherein the internal fluid chamber is configured such that fluid within the internal fluid chamber is caused to centrifugally flow within the internal chamber radially outwards from the axis of rotation of the turbine when the turbine is rotating, thereby increasing the rotational inertia of the turbine.

Optionally, the internal fluid chamber is shaped such that as the rate of rotation of the turbine increases, fluid is caused to centrifugally flow further from the axis of rotation, such that increasing rates of rotation of the turbine increase the rotational inertia of the turbine.

Optionally the chamber extends between 5% and 95% of the radius of the turbine, for example between about 10% and 90%, about 15% and 85%, about 20% and 80%, about 30% and 70%, about 40% and 60%, between 50% and 100% or any combination thereof, for example between 10% and 70%, or between 50% and 60%.

Optionally, the internal fluid chamber comprises a wall having an arcuate surface which curves outwardly, along the axis of rotation of the turbine, with respect to the axis of rotation of the turbine along the axis of rotation. Thus, the surface is configured such that, when the turbine is not rotating, fluid within the internal fluid chamber is accumulated at bottom of the internal chamber and, as the turbine rotates, fluid is caused to flow radially outwards with respect to the rotational axis of the turbine to thereby increase the rotational inertia of the turbine. Optionally, the arcuate wall of the turbine is shaped such that, along the rotational axis of the turbine (i.e. from one end of the turbine towards the other), it becomes further away from the rotational axis of the turbine. Optionally, the arcuate surface forms the base of the internal fluid chamber. Optionally, the internal fluid chamber comprises a fluid well in which the fluid accumulates when the turbine is not rotating. Optionally, the fluid well is deepest towards the rotational axis of the turbine and becomes increasingly more shallow away from the rotational axis of the turbine.

Optionally, the internal fluid chamber is closed such that the fluid is unable to flow out of the internal fluid chamber.

Optionally, the internal fluid chamber contains fluid.

Optionally, the turbine is supported by magnetic bearings spaced apart from each other along the rotational axis of the turbine. Magnetic bearings provide reduced frictional losses.

Optionally, the turbine is an axial turbine.

The present invention can be carried out in various ways and preferred embodiments of a convection-driven power generator and a turbine in accordance with the invention will now be described by way of example with reference to the accompanying drawings, in which.

Figure 1:
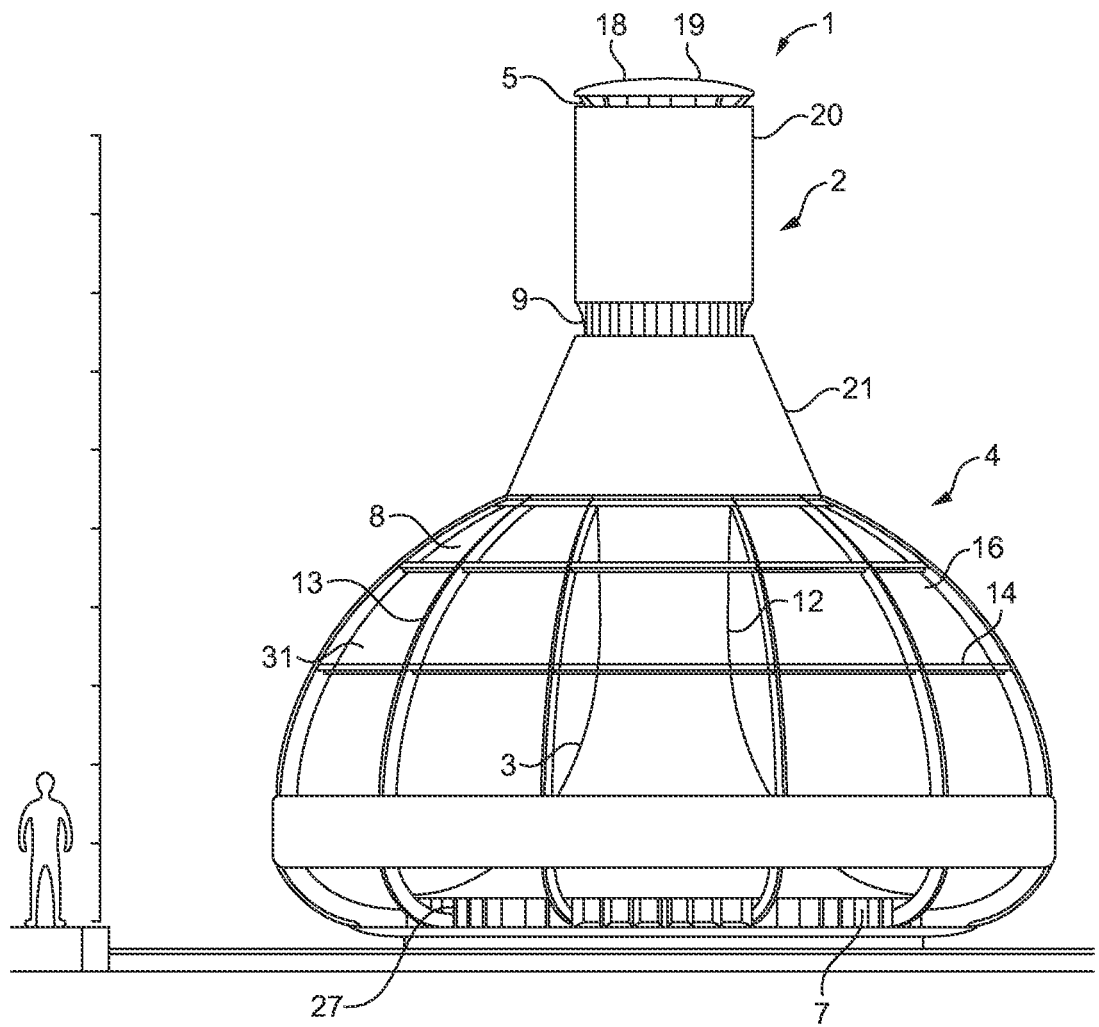
FIG. 1 is a side view of a preferred embodiment of a convection-driven power generator according to a first embodiment of the present invention.

A convection-driven power generator 1 according to a first aspect of the present invention is shown in FIG. 1. The convection-driven power generator comprises a vertically arranged chimney 2 which extends out of the top of, and at the centre of, a heating chamber 4. The chimney 2 of this embodiment, and all other embodiments described herein, may also be referred to as a tower 2, such as a flow tower 2. The chimney 2 comprises a flow duct 3 passing longitudinally and substantially coaxially therethrough. The flow duct 3 is therefore substantially or generally vertically arranged within the power generator 1. The chimney 2, at least partially, houses the flow duct 3 and therefore can also be referred to as a flow duct housing 2. In other words, the flow duct 3 extends vertically out of the top of, and in the centre of, the heating chamber 4 and the chimney forms a flow-duct housing for housing the portion of the flow duct 3 which extends outside of the heating chamber 4. A flow intake 5 is provided at or towards a distal end of the chimney 2, namely the highest end of the chimney 2, and which is fluidly coupled to the flow duct 3. The flow intake 5 is configured to supply fluid to the flow duct 3. In particular, the flow intake 5 may in some embodiments be configured to supply ambient fluid to the chimney 2, for example ambient air and thus may serve as an ambient air intake for supplying ambient air to the flow duct 3. In the embodiment of FIG. 1 the flow intake 5 is configured as a slot which extends around the periphery of the chimney 2. A turbine 10 (FIG. 2) is arranged within the flow duct 3, specifically within the portion of the flow duct which is within the heating chamber 4 (i.e. not the portion of the flow duct 3 which extends vertically out of the top of the heating chamber 4).

The flow intake 5 comprises a variable flow-restrictor 18 configured to vary the flow rate through the flow intake 5 and thereby through the flow duct 3 by varying the resistance to the flow. As the variable flow-restrictor 18 varies the flow rate through the flow duct 3, it also varies the rotation-rate of the turbine 10 and thereby the power output of the generator 1. In this embodiment, this is achieved by varying the cross-sectional area of the flow intake 5 to thereby allow less or more fluid, e.g. air, into the flow duct 3. In this embodiment, the variable flow-restrictor 18 comprises a plug 19 which is axially moveable with respect to the flow duct 3 or chimney 2 so as to vary the cross-sectional area of the flow intake 5 and thereby control the fluid flow rate flowable through the generator 1. In other embodiments a collar 20 may alternatively or additionally be provided which extends around the periphery of the chimney 2 and which is also axially moveable with respect to the flow duct 3 or chimney 2 so as to vary the cross-sectional area of the flow intake 5 and thereby control the fluid flow rate flowable through the generator 1. In these embodiments, the flow intake 5 may comprise a slot 5 which extends peripherally around the chimney 2 and which is defined by the gap between the chimney 2 and the axially-moveable plug 19.

A heating chamber 4 is provided at the opposite end of the chimney 2, and therefore flow duct 3, to the flow intake 5. The flow duct 3 passes vertically through the centre of the heating chamber 4 which, in this embodiment, is generally or substantially an oblate spheroid in shape although other configurations and shapes of the heating chamber 4 may alternatively be used as will be seen below. Thus, the heating chamber 4 may be said to be substantially or generally toroidal, or oblate toroidal, in shape as it defines as central aperture or annulus 12 through which the flow duct 3 passes and therefore defines a substantially toroidal fluid space within the heating chamber 4.

Spaced between the distal end of the chimney 2 and the heating chamber 4, a flow exhaust 9 is provided. The flow exhaust 9 is configured to allow fluid to flow out of the heating chamber 4 by convection (in this embodiment, solely by convection, however example are envisaged where convection may be assisted, e.g. by a fan, and in such embodiments, the fluid may exist the flow exhaust predominantly by convection) and, in some embodiments where the fluid is air, to the ambient air surrounding the power generator 1. Thus the flow exhaust 9 is configured to allow heated fluid to exit the power generator 1.

The flow exhaust 9 also comprises a variable flow-restrictor 21 configured to vary the flow rate through the flow exhaust 9 by varying the resistance to the flow through the flow exhaust 9. The exhaust variable flow-restrictor 21 is in this embodiment configured to vary the cross-sectional area of the flow exhaust so as to control the rate of fluid flow flowable through the flow duct 3 and thereby through the generator 1. In the embodiment of FIG. 1, the exhaust variable flow-restrictor 21 comprises one or more panels 21 which are pivotably mounted to the generator 1, for example to the chimney 2 or heating chamber 4, such that pivoting the panels 21 causes the cross-sectional area of the flow exhaust 9 to be varied.

It is not necessary for the power generator 1 to require both the intake variable flow-restrictor 18 as well as the exhaust flow-restrictor 21 in order to control fluid flow through the generator 1—either one, or both, may optionally be provided.

The proximal end of the flow duct 3, that is the end of the flow duct 3 which is opposite to the end fluidly coupled to the flow intake 5, comprises a flow duct outlet 7 which is fluidly coupled to the heating chamber 4 such that fluid from the flow duct 3 may flow into the heating chamber 4. In this embodiment, although it is not essential, the proximal end of the flow duct 3 is configured to arcuately flare radially outwards to form a generally or substantially conical shape. The flow duct outlet 7 comprises a circumferentially extending slot which comprises a plurality of radially spaced strakes 27 configured to segment the flow and to condition it in order to reduce the turbulence of the flow and may optionally be configured to provide laminar flow to the heating chamber 4.

The heating chamber 4 comprises an external wall 8 which is configured to transmit light radiation incident thereon such that fluid within the heating chamber is heated by the transmitted light radiation. The heating chamber 4 therefore defines an internal fluid heating space 31 within which the fluid is heated by the light radiation transmitted by the external wall 8. In this embodiment and in the others described herein, the light radiation may optionally be solar light radiation.

In this embodiment, the external wall 8 is optionally made from plastic sheeting which is optionally supported by a support structure which may optionally comprise ribs such as longitudinally extending ribs 13 and/or laterally extending ribs 14. Equally, glass or other such light transmitting materials may also be used for the external wall 8 instead of the plastic sheeting and which may not require a support structure.

The external wall 8 by virtue of its arcuate shape is configured to substantially focus the light radiation incident on it into the internal fluid heating space 31 within the heating chamber 4. Thereby, the power-generator 1 increases the heating effect of the transmitted light and improves the efficiency of the generator 1. Optionally, to further improve the heating effect and efficiency of the generator 1, the generator 1, for example the external wall 8, may comprise a lens element 11 configured to focus the light radiation transmitted by the external wall 8 within the heating chamber. The lens element 11 may have a focal point or focal locus 32 which is within the heating chamber but is spaced away from all interior surfaces thereof (e.g. spaced away from all light receiving surfaces thereof) such that the focused light radiation directly heats the fluid within the heating chamber, i.e. the fluid within the internal fluid heating space 31 of the heating chamber. Thus, the fluid is heated solely, or at least predominantly, directly by the transmitted light. Optionally, the lens element 11 may be configured to focus the transmitted light radiation to an area, locus or point 32 which is within the heating chamber 4 but spaced away from all interior surfaces thereof (including the external wall 8, for example all surfaces which define the internal fluid heating space) such that the focused light radiation directly heats the fluid within the heating chamber 4. In the embodiment of FIG. 1, the arcuate external wall 8 itself, by virtue of its arcuate shape, comprises the lens element 11. Thus, the external wall 8 itself may be configured so as to focus the transmitted light radiation to an area, locus or point 32 which is within the heating chamber 8 but spaced away from all interior surfaces thereof such that the focused light radiation directly heats the fluid within the heating chamber 4. The locus 32 may extend circumferentially around the flow duct 3 within the heating chamber 4 to form a heating zone which is substantially ring-shaped or toroidal.

As in some embodiments the arcuate shape of the external wall 8 itself may form the lens element 11, the external wall 8 may optionally comprise two spaced-apart layers 14, 16 of material. The two layers of material may have an air-gap therebetween to reduce the thermal losses to the environment or the two layers may have a space therebetween which is configured to be filled with water, or another suitable liquid, thereby improving the focusing effect of the lens element 11.

Figure 2:
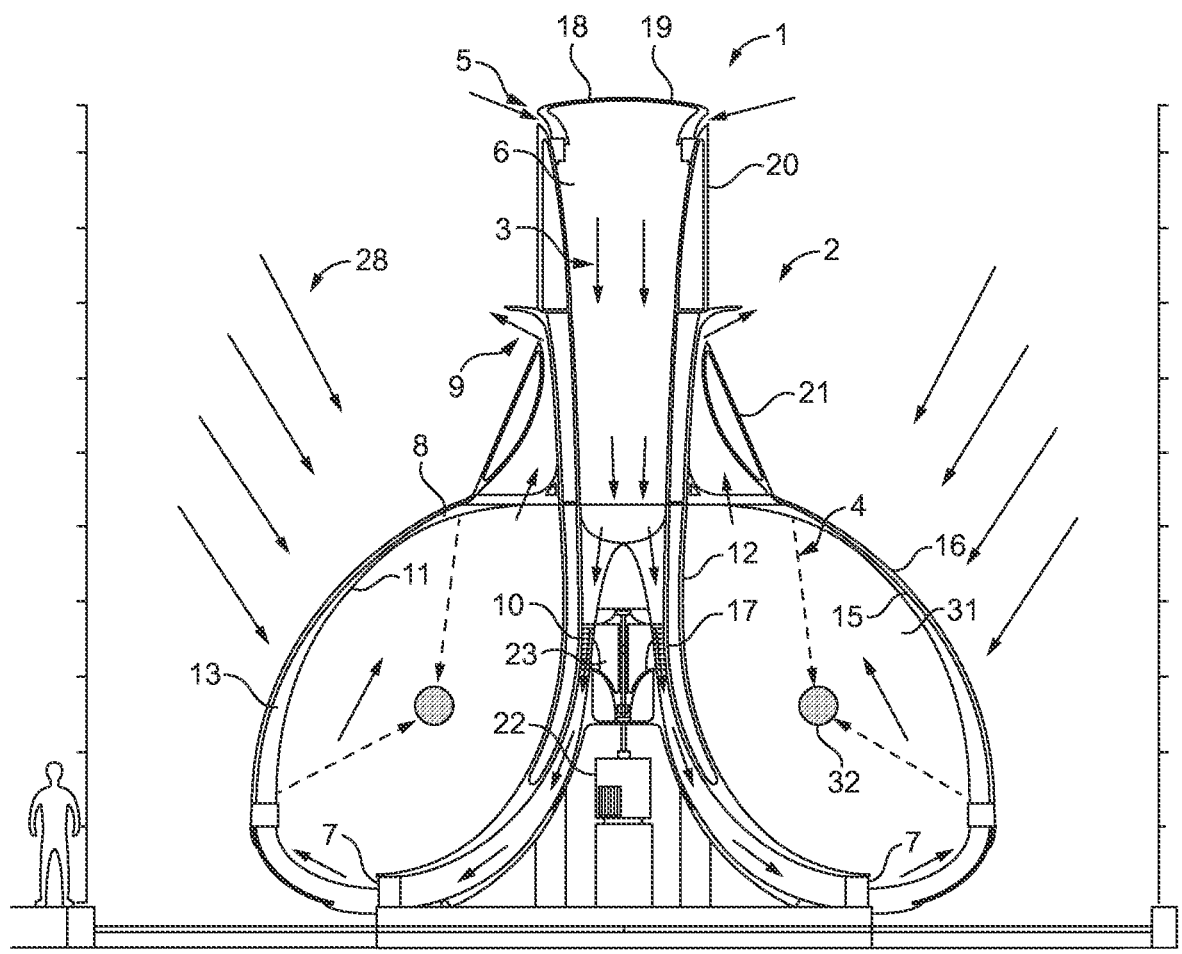
FIG. 2 is a side cross-sectional view of the embodiment of FIG. 1, taken through a central vertical plane of the power generator.

As can be seen in FIG. 2, which shows a cross sectional-view of the embodiment of FIG. 1, the flow duct 3 comprises a convergent divergent nozzle 17. The convergent divergent nozzle 17 is configured to accelerate the fluid flow within the flow duct 3. An axial turbine 10 is provided at the throat of the nozzle 17, such that it is exposed to the flow within the flow duct 3. Providing the turbine 10 at the throat of the nozzle 17 means that it is provided with accelerated fluid flow as the nozzle 17 accelerates the flow from a speed which may not otherwise be optimal to drive turbine 10. The turbine 10 is operably coupled to an electrical generator 22 such that rotation of the turbine causes the electrical generator 22 to generate electrical power. A shaft forms the operable connection between the turbine 10 and the electrical generator 22.

Although not shown in the drawings, the first embodiment, as well as all of the embodiments described herein, may comprise stator blades arranged upstream of the turbine. The stator blades are configured to cause the flow to spiral down the flow duct before it passes through the turbine. Thus, the stator blades are configured to impart rotational momentum to the flow such that the flow is caused to rotate about the longitudinal axis of the flow duct as the fluid flows along the duct. The stator blades therefore cause the turbine to rotate more readily as the fluid is already rotating.

The operation of the convection-driven generator will now be described, with reference to FIG. 2. As light radiation 28 falls on the external wall 8 of the heating chamber 4, it is transmitted by the external wall 8 and focused by the lens element 11 into the interior fluid heating space 31 of the heating chamber 4 which is filled with fluid to be heated.

The focused light may in some embodiments be focused a point or a locus 32 which is spaced away from the interior surfaces of the heating chamber 4 such that the transmitted and focused light directly heats the fluid within the heating chamber 4. Thus the lens element 11 is configured to form a heating zone which is spaced away from the interior walls or surfaces of the heating chamber 4 such that the transmitted and focused light directly heats the fluid within the heating chamber. Thus, the fluid within the heating chamber 4 in some embodiments may not be heated by conduction, or at least not predominately by conduction, e.g. by conduction of heat from an interior surface of the heating chamber 4, but is instead heated predominately directly by the transmitted light within the heating zone.

As the fluid within the heating chamber 4 is heated by the transmitted light radiation 28, it begins to rise upwards by convection and escapes the heating chamber 4, and the generator 1, through the flow exhaust 9. The temperature to which the fluid is heated is controlled by the exhaust variable flow restrictor 21 by controlling the rate at which fluid is able to flow out of the heating chamber 4. Thus, the exhaust variable flow restrictor 21 is pivoted to a position in order to achieve the desired temperature within the heating chamber 4 and thereby the desired fluid flow rate out of the heating camber 4. Once the heated fluid passes through the exhaust variable flow restrictor 21, it is then exhausted to the ambient surroundings.

The escape of heated fluid from the heating chamber 4 causes a reduced pressure in the heating chamber 4 which causes more fluid to be drawn into the heating chamber 4 via flow duct outlet 7, thereby pulling fluid down the flow duct 3 and establishing a fluid current through the flow duct 3. This in turn causes un-heated, ambient air to enter the generator via the flow duct 3 via flow intake 5, the flow rate of the un-heated fluid being controllable via the intake variable flow restrictor 18.

The established fluid current through the flow duct 3 drives rotation of the axial turbine 10 which thus generates electrical power via electrical generator 22 operably coupled to the turbine 10 via a shaft.

Figure 6:
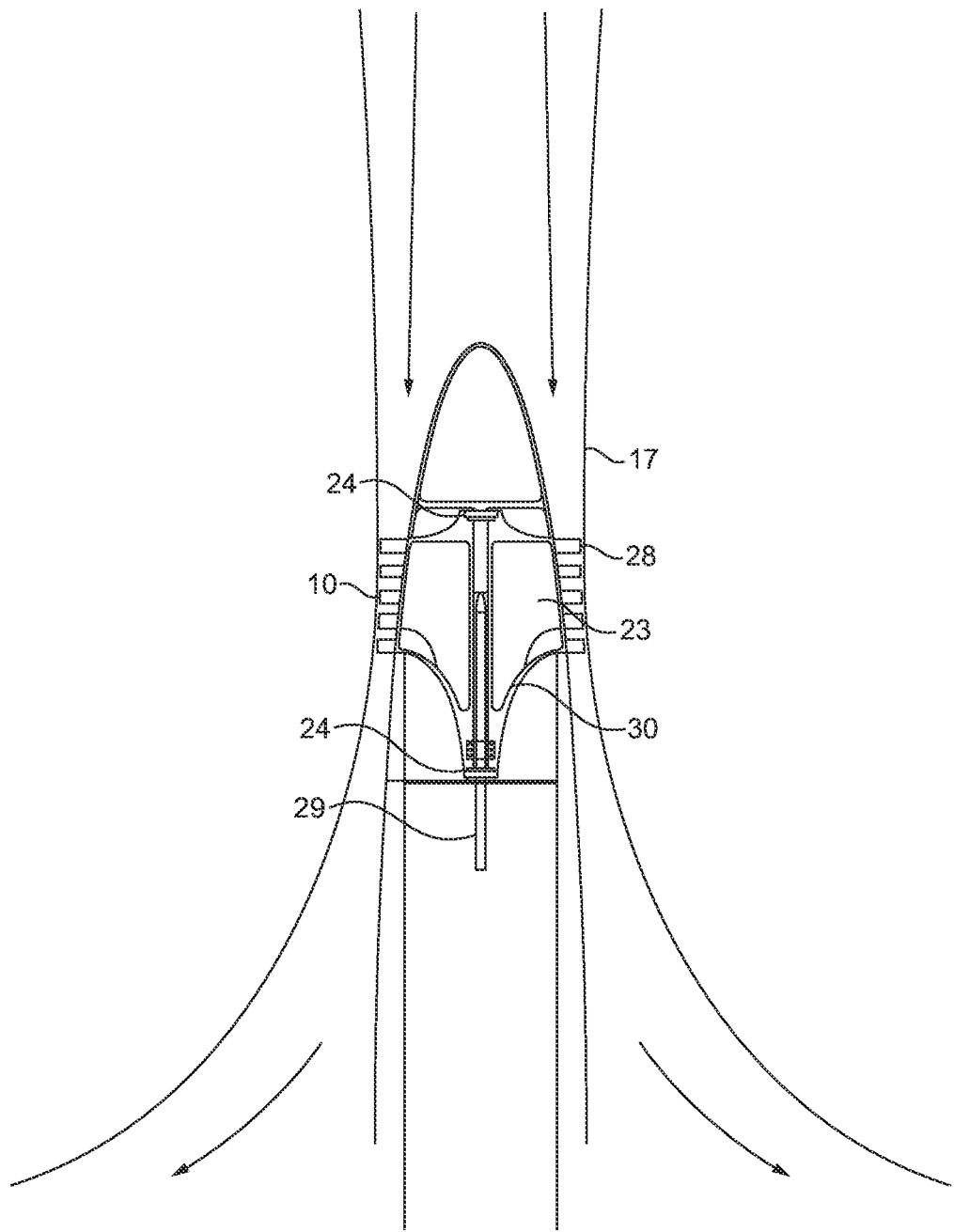
FIG. 6 is a side cross-sectional schematic diagram of a flow duct according to certain principles of the present invention and as used in each of the embodiments disclosed herein.
Figure 10:
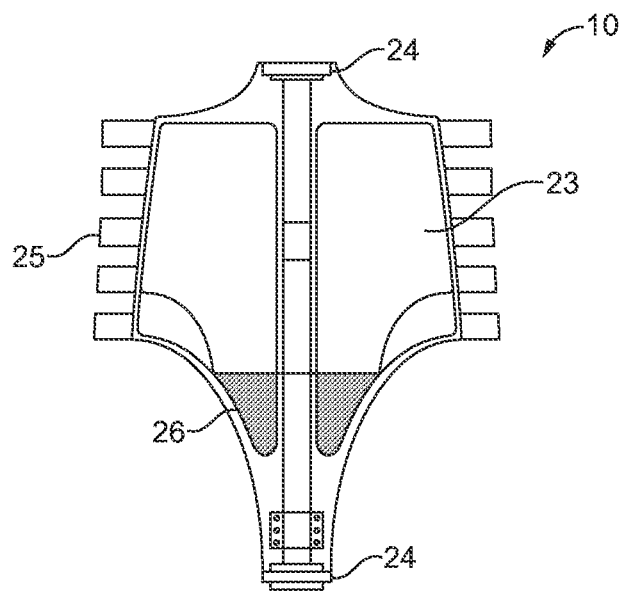

As can be seen more readily in FIGS. 6 and 10, the axial turbine 10 comprises an internal fluid chamber 23 containing, or configured to contain, a viscous liquid 26. The internal fluid chamber 23 is configured such that the viscous liquid is caused to flow radially outwards within the fluid chamber through centrifugal acceleration of the viscous liquid upon rotation of the turbine. In particular, the internal fluid chamber 23 comprises a base having an arcuate internal surface which curves outwardly with respect to the axis of rotation of the turbine 10 along the axis of rotation, forming a flared-radially-outwardly dish, cone or fluid well having its deepest portion towards the centre of the axis of rotation of the turbine. As the turbine 10 rotates with increasing speed, so the viscous liquid 26 flow by centrifugal acceleration out of the well, radially outwards, thereby increasing the rotational inertia of the turbine. Thus, the performance of the turbine at higher fluid flow rates is improved, while reducing the chance of the turbine stalling at lower fluid flow rates. Thus, the range of operational rotation rates of the turbine is increased. The internal fluid chamber 23 may be closed, that is, it may contain the viscous fluid such that the viscous fluid may not flow out of the chamber 23. Alternatively, examples are envisaged wherein the internal fluid chamber 23 has a fluid supply line for supplying/extracting fluid from the internal fluid chamber 23 so as to vary the quantity of viscous fluid within the internal fluid chamber 23 to thereby vary the rotational inertia as desired. A pump could be used for pumping the viscous fluid through the fluid supply line.

The turbine 10 is supported by magnetic bearings 24 spaced apart from each other along the rotational axis of the turbine 10 and substantially concentric with the rotational axis of the turbine. The magnetic bearings 24 reduce frictional losses of the turbine, thereby improving the overall efficiency of the generator 1, although other means of supporting the turbine 10 could alternatively be used. The internal fluid chamber 23 is arranged between the magnetic bearings 24.

Figure 3:
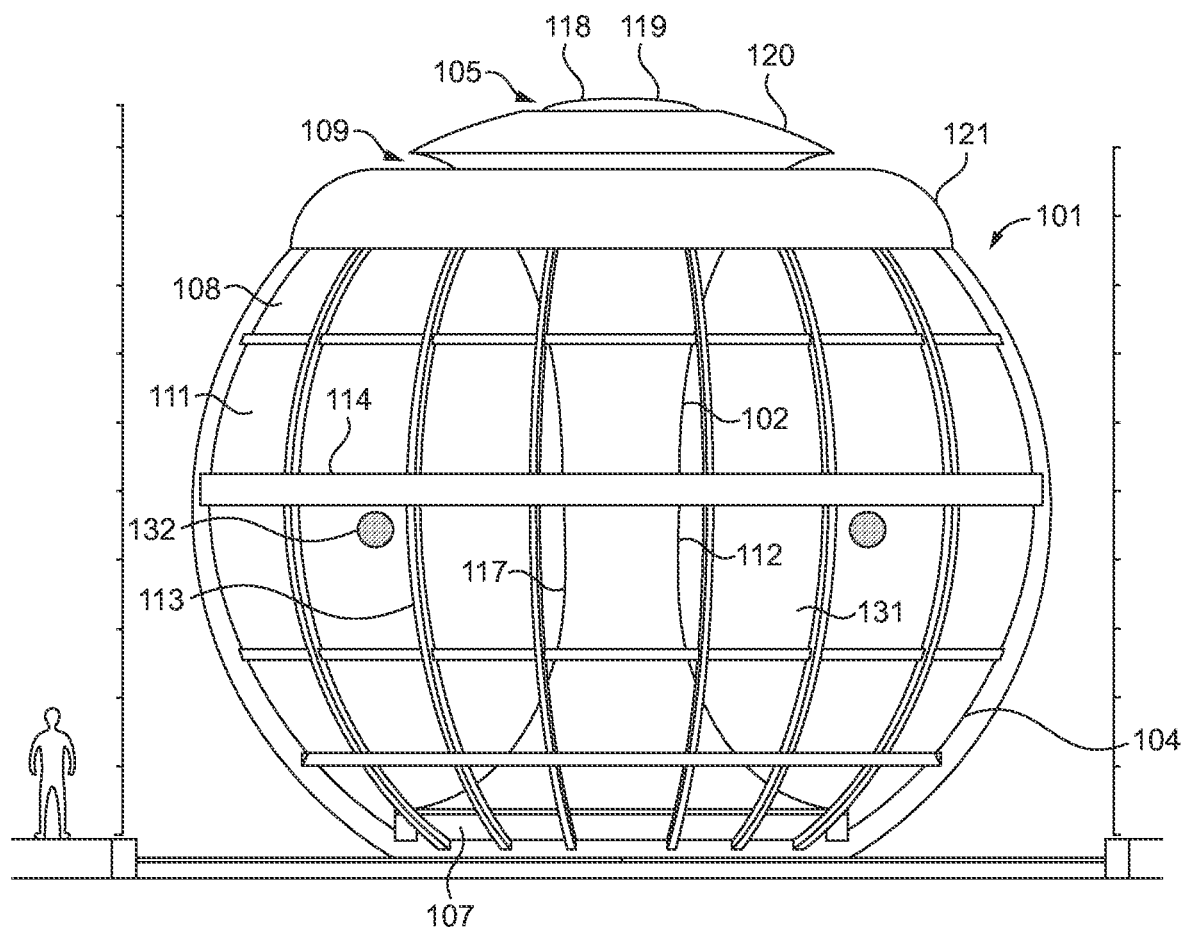
FIG. 3 is a side view of a preferred embodiment of a convection-driven power generator according to a second embodiment of the present invention, the second embodiment being substantially spheroidal in shape.
Figure 4:
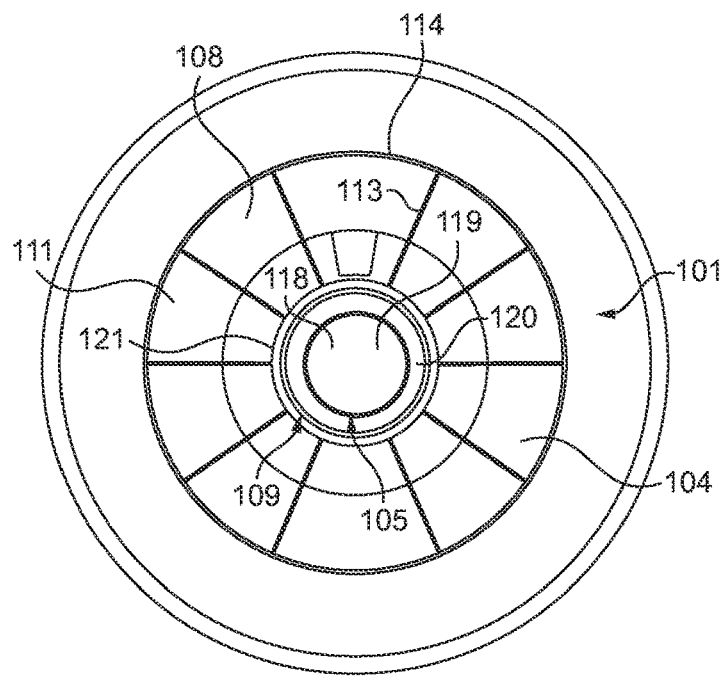
FIG. 4 is a top down view of the embodiment of FIG. 3.

Turning now to FIGS. 3 and 4, a second embodiment of a convection-driven power generator is shown. Similar features as those of the embodiment of FIG. 1 are also shown but with the reference numbers increased by 100. The embodiment of FIG. 3 is substantially the same as that of FIG. 1, having all of the same features of the embodiment of FIG. 1 except that the heating chamber is substantially spheroidal and extends higher up the flow duct than in FIG. 1. The embodiment of FIG. 3 is preferred in operating environments in which the incident light shines more in from the sides than it does down on top of the generator 1, for example in locations towards the poles of the Earth or for use during winter.

The convection-driven power generator 101 comprises a vertically arranged chimney 102 which extends within the centre of a substantially spherical heating chamber. The chimney 102 comprises a flow duct 103 passing longitudinally and coaxially therethrough in exactly the same way as in FIG. 1. The flow duct 103 is therefore also substantially or generally vertically arranged within the power generator 101. The chimney 102 houses the flow duct 103 and therefore can also be referred to as a flow duct housing 102. A flow intake 105 is provided at or towards a distal end of the chimney 102, namely the highest end of the chimney 102, and which is fluidly coupled to the flow duct 103. The flow intake 105 is configured to supply fluid to the flow duct 103. In particular, the flow intake 105 may in some embodiments be configured to supply ambient fluid to the chimney 102, for example ambient air and thus may serve as an ambient air intake for supplying ambient air to the flow duct 103. In the embodiment of FIG. 1 the flow intake 105 is configured as a slot 105 which extends around the periphery of the chimney 102.

The flow intake 105 comprises a variable flow-restrictor 118 configured to vary the flow rate through the flow intake 105 by varying the flow rate through the flow duct 103 by varying the resistance to the flow. As the variable flow-restrictor 118 varies the flow rate through the flow duct 103, it also varies the rotation-rate of the turbine 120 and thereby the power output of the generator 101. In this embodiment, this is achieved by varying the cross-sectional area of the flow intake 105 to thereby allow less or more fluid, e.g. air, into the flow duct 103. In this embodiment, the variable flow-restrictor 118 comprises a plug 119 which is axially moveable with respect to the flow duct 103 or chimney 102 so as to vary the cross-sectional area of the flow intake 105 and thereby control the fluid flow rate flowable through the generator 101. Thus, the flow intake 105 may comprise a slot 105 which extends peripherally around the chimney 102 and which is defined by the gap between the chimney 102 and the axially-moveable plug 119.

A substantially spheroidal heating chamber 104 is provided such that the flow duct 103 passes vertically through the centre of the heating chamber 104. Thus, the heating chamber 104 may be said to be substantially or generally toroidal in shape as it defines as central aperture or annulus 112 through which the flow duct 103 passes and therefore defines a substantially toroidal fluid space within the heating chamber 104.

Spaced between the distal end of the chimney 102 and the heating chamber 104, a flow exhaust 109 is provided. The flow exhaust 109 is configured to allow fluid to flow out of the heating chamber 104 by convection and, in some embodiments where the fluid is air, to the ambient air surrounding the power generator 101. Thus the flow exhaust 9 is configured to allow heated fluid to exit the power generator 101.

The flow exhaust 109 also comprises a variable flow-restrictor 121 configured to vary the flow rate through the flow exhaust 109 by varying the resistance to the flow through the flow exhaust 109. The exhaust variable flow-restrictor 121 is in this embodiment configured to vary the cross-sectional area of the flow exhaust so as to control the rate of fluid flow flowable through the flow duct 103 and thereby through the generator 101. In the embodiment of FIG. 3, the exhaust variable flow-restrictor 121 comprises one or more panels 121 which are pivotably mounted to the generator 101, for example to the chimney 102 or heating chamber 104, such that pivoting the panels 121 causes the cross-sectional area of the flow exhaust 109 to be varied.

It is not necessary for the power generator 101 to require both the intake variable flow-restrictor 118 as well as the exhaust flow-restrictor 121 in order to control fluid flow through the generator 101—either one, or both, may optionally be provided.

The proximal end of the flow duct 103, that is the end of the flow duct 103 which is opposite to the end fluidly coupled to the flow intake 105, comprises a flow duct outlet 107 which is fluidly coupled to the heating chamber 104 such that fluid from the flow duct 103 may flow into the heating chamber 104. In this embodiment, although it is not essential, the proximal end of the flow duct 103 is configured to arcuately flare radially outwards to form a generally or substantially conical shape.

The heating chamber 104 comprises an external wall 108 which is configured to transmit light radiation incident thereon such that fluid within the heating chamber is heated by the transmitted light radiation. The heating chamber 104 therefore defines an internal fluid heating space 131 within which the fluid is heated by the light radiation transmitted by the external wall 108. In this embodiment and in the others described herein, the light radiation may optionally be solar light radiation.

In this embodiment, the external wall 108 is optionally made from plastic sheeting which is optionally supported by a support structure which may optionally comprise ribs such as longitudinally extending ribs 113 and/or laterally extending ribs 114. Equally, glass or other such light transmitting materials may also be used for the external wall 108 instead of the plastic sheeting and which may not require a support structure.

The external wall 108 by virtue of its arcuate shape is configured to substantially focus the light radiation incident on it into the internal fluid heating space 31 within the heating chamber 104. Thereby, the power-generator 101 increases the heating effect of the transmitted light and improves the efficiency of the generator 101. Optionally, to further improve the heating effect and efficiency of the generator 101, the generator 101, for example the external wall 108, may comprise a lens element 111 configured to focus the light radiation transmitted by the external wall 108 within the heating chamber 104. The lens element 111 may have a focal point or focal locus 132 which is within the heating chamber but is spaced away from all interior surfaces thereof (e.g. spaced away from all light receiving surfaces thereof) such that the focused light radiation directly heats the fluid within the heating chamber, i.e. the fluid within the internal fluid heating space 131 of the heating chamber. Thus, the fluid is heated solely, or at least predominantly, directly by the transmitted light. Optionally, the lens element 111 may be configured to focus the transmitted light radiation to an area, locus or point 132 which is within the heating chamber 104 but spaced away from all interior surfaces thereof (including the external wall 108, for example all surfaces which define the fluid heating space) such that the focused light radiation directly heats the fluid within the heating chamber 104. The embodiment of FIG. 3, as an alternative to the embodiment of FIG. 1, uses panes of glass which are shaped so as to form a lens element 111, although the plastic sheeting arrangement of FIG. 1 could instead be used. The locus 132 may extend circumferentially around the flow duct 103 within the heating chamber 104 to form a heating zone which is substantially ring-shaped or toroidal.

As in some embodiments the arcuate shape of the external wall 108 itself may form the lens element 11, the external wall 8 may alternatively comprise two spaced-apart layers 114, 116 of material. The two layers of material may have an air-gap therebetween to reduce the thermal losses to the environment or the two layers may have a space therebetween which is configured to be filled with water, or another suitable liquid, thereby improving the focusing effect of the lens element 111.

In the same way as in FIG. 2, which shows a cross sectional-view of the embodiment of FIG. 1, the flow duct 103 of the second embodiment of FIG. 3 comprises a convergent divergent nozzle 117, although this is not explicitly shown in the figures. The convergent divergent nozzle 117 is configured to accelerate the fluid flow within the flow duct 103. An axial turbine 110 is provided at the throat of the nozzle 117, such that it is exposed to the flow within the flow duct 103. Providing the turbine 110 at the throat of the nozzle 117 means that it is provided with accelerated fluid flow as the nozzle 117 accelerates the flow from a speed which may not otherwise be optimal to drive turbine 110. The turbine 110 is operably coupled to an electrical generator 122 such that rotation of the turbine causes the electrical generator 122 to generate electrical power. A shaft forms the operable connection between the turbine 110 and the electrical generator 122.

Figure 5:
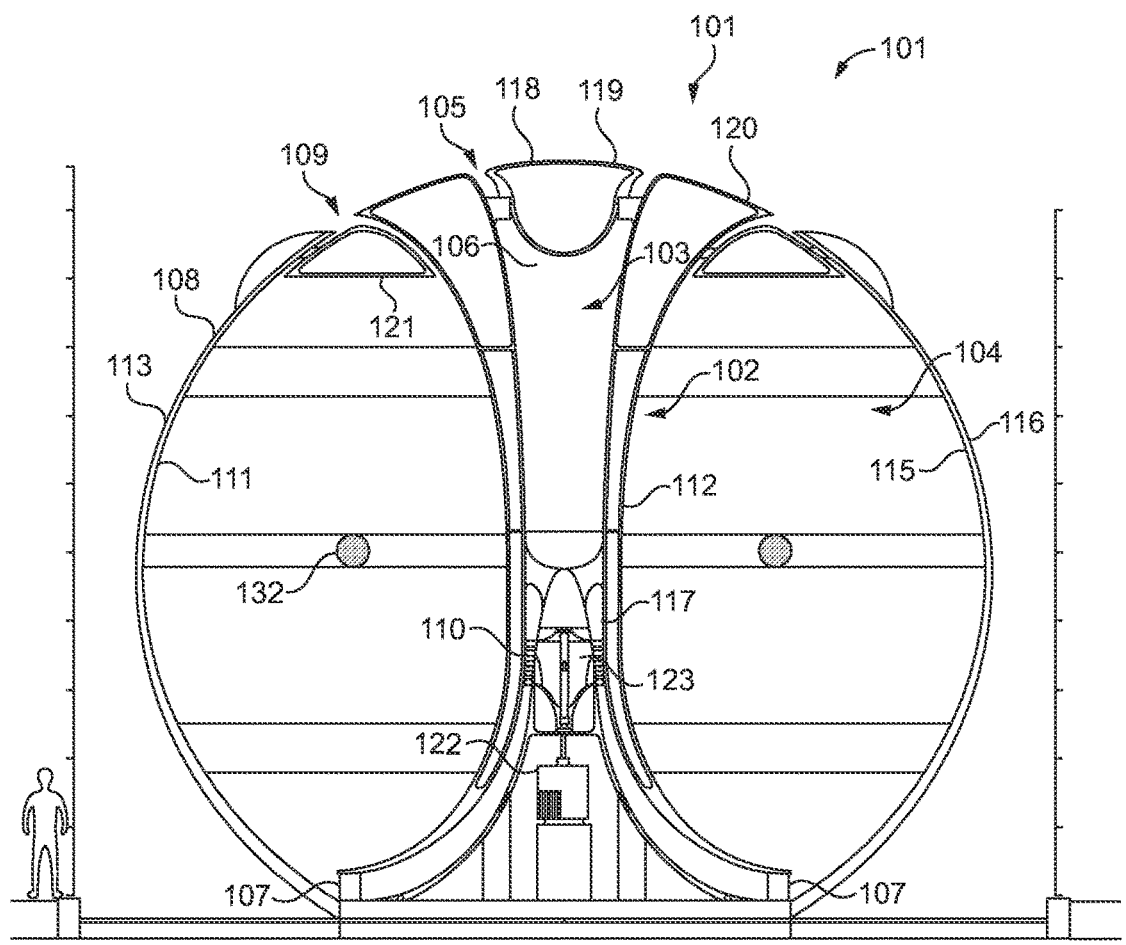
FIG. 5 is a side cross-sectional view of the embodiment of FIG. 3, taken through a central vertical plane of the power generator.

The operation of the second embodiment of the convection-driven generator is substantially the same as that of the first. With reference to FIG. 5, as light radiation falls on the external wall 108 of the heating chamber 104, it is transmitted by the external wall 108 and focused by the lens element 111 into the interior fluid heating space 131 of the heating chamber 104 which is filled with fluid to be heated.

The focused light may in some embodiments be focused to a point or a locus 132 which is spaced away from the interior surfaces of the heating chamber 104 such that the transmitted and focused light directly heats the fluid within the heating chamber 104. Thus, the lens element 111 is configured to form a heating zone which is spaced away from all internal walls or surfaces of the heating chamber 104 such that the transmitted and focused light directly heats the fluid within the heating chamber 104. Thus, the fluid within the heating chamber 104 in some embodiments may not be heated by conduction, or at least not predominantly by conduction, e.g. by conduction of heat from an interior surface of the heating chamber 104, but is instead heated predominately directly by the transmitted light within the heating zone.

As the fluid within the heating chamber 104 is heated by the transmitted light radiation 28, it begins to rise upwards by convection and escapes the heating chamber 104, and the generator 101, through the flow exhaust 109. The temperature to which the fluid is heated is controlled by the exhaust variable flow restrictor 121 by controlling the rate at which fluid is able to flow out of the heating chamber 104. Thus, the exhaust variable flow restrictor 121 is positioned in order to achieve the desired temperature within the heating chamber 104 and thereby the desired fluid flow rate out of the heating camber 104. Once the heated fluid passes through the exhaust variable flow restrictor 121, it is then exhausted to the ambient surroundings. In this embodiment, the flow restrictor 121 is slidable rather than pivotable and serves as a plug 121 to plug the flow exhaust 109, thereby controlling the rate of fluid flow from the heating chamber 104 and through the generator 101.

The escape of heated fluid from the heating chamber 104 causes a reduced pressure in the heating chamber 104 which causes more fluid to be drawn into the heating chamber 104 via flow duct outlet 107, thereby pulling fluid down the flow duct 103 and establishing a fluid current through the flow duct 103. This in turn causes un-heated, ambient air to enter the generator 101 via the flow duct 103 via flow intake 105, the flow rate of the un-heated fluid being controllable via the intake variable flow restrictor 118.

The established fluid current through the flow duct 103 drives rotation of the axial turbine 110 which thus generates electrical power via electrical generator 122 operably coupled to the turbine 110 via a shaft.

As can be seen more readily in FIGS. 6 and 10, the axial turbine 110 comprises an internal chamber 23 containing, or configured to contain, a viscous liquid 26. The internal chamber 23 is configured such that the viscous liquid is caused to flow radially outwards within the chamber through centrifugal acceleration of the viscous liquid upon rotation of the turbine. In particular, the internal chamber 23 comprises a base having an arcuate internal surface which curves outwardly with respect to the axis of rotation of the turbine 110 along the axis of rotation, forming a flared-radially-outwardly dish, cone or fluid well. As the turbine 110 rotates with increasing speed, so the viscous liquid 26 is pulled out of the fluid well 30 by centrifugal acceleration, thereby increasing the rotational inertia of the turbine. Thus, the performance of the turbine 110 at higher fluid flow rates is improved, while reducing the chance of the turbine 110 stalling at lower fluid flow rates.

The turbine 110 is supported by magnetic bearings 24 spaced apart from each other along the rotational axis of the turbine 110 and substantially concentric with the rotational axis of the turbine 110. The magnetic bearings 24 reduce frictional losses of the turbine, thereby improving the overall efficiency of the generator 101, although other means of supporting the turbine 110 could alternatively be used.

Figure 7:
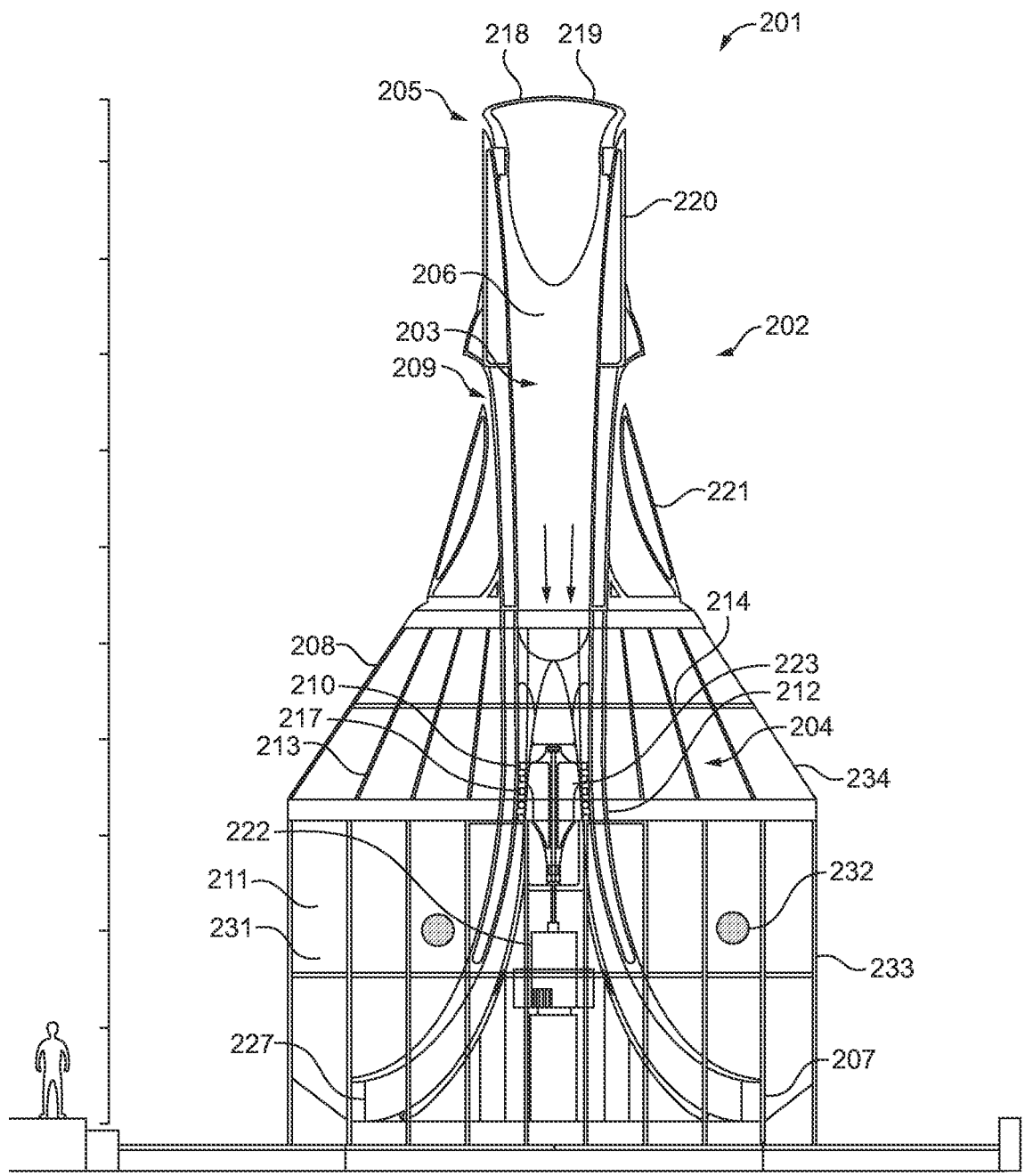
FIG. 7 is a side partial cross-sectional view of a preferred embodiment of a convection-driven power generator according to a third embodiment of the present invention.

Turning now to FIG. 7, a third embodiment of a convection-driven power generator 201 is shown. Similar features as those of the embodiment of FIG. 1 are also shown but with the reference numbers increased by 200. The embodiment of FIG. 7 is substantially the same as that of FIG. 1, having all of the same features of the embodiment of FIG. 1 except that the heating chamber comprises an external wall having a substantially tubular section 233 and a substantially conical section 234 arranged on top of the tubular section 233.

The convection-driven power generator 201 of the third embodiment comprises a vertically arranged chimney 202 which extends out of the centre of a heating chamber 204. The chimney 202 of this embodiment, and all other embodiments described herein, may also be referred to as a tower 202, such as a flow tower 202. The chimney 202 comprises a flow duct 203 passing longitudinally and substantially coaxially therethrough. The flow duct 203 is therefore substantially or generally vertically arranged within the power generator 201. The chimney 202, at least partially, houses the flow duct 203 and therefore can also be referred to as a flow duct housing 202. A flow intake 205 is provided at or towards a distal end of the chimney 202, namely the highest end of the chimney 202, and which is fluidly coupled to the flow duct 203. The flow intake 205 is configured to supply fluid to the flow duct 203. In particular, the flow intake 205 may in some embodiments be configured to supply ambient fluid to the chimney 202, for example ambient air and thus may serve as an ambient air intake for supplying ambient air to the flow duct 203. In the embodiment of FIG. 1 the flow intake 205 is configured as a slot which extends around the periphery of the chimney 202.

The flow intake 205 comprises a variable flow-restrictor 218 configured to vary the flow rate through the flow intake 205 and thereby vary the flow rate through the flow duct 203 by varying the resistance to the flow. As the variable flow-restrictor 218 varies the flow rate through the flow duct 203, it also varies the rotation-rate of the turbine 210 and thereby the power output of the generator 201. In this embodiment, this is achieved by varying the cross-sectional area of the flow intake 205 to thereby allow less or more fluid, e.g. air, into the flow duct 203. In this embodiment, the variable flow-restrictor 218 comprises a plug 219 which is axially moveable with respect to the flow duct 203 or chimney 202 so as to vary the cross-sectional area of the flow intake 205 and thereby control the fluid flow rate flowable through the generator 201. In other embodiments a collar 220 may alternatively or additionally be provided which extends around the periphery of the chimney 202 and which is also axially moveable with respect to the flow duct 203 or chimney 202 so as to vary the cross-sectional area of the flow intake 205 and thereby control the fluid flow rate flowable through the generator 201. In these embodiments, the flow intake 205 may comprise a slot 205 which extends peripherally around the chimney 202 and which is defined by the gap between the chimney 202 and the axially-moveable plug 219.

A heating chamber 204 is provided at the opposite end of the chimney 202, and therefore flow duct 203, to the flow intake 205. The flow duct 203 passes vertically through the centre of the heating chamber 204 which, in this embodiment, comprises a substantially conical external wall 234 arranged on top of a substantially tubular external wall 233, although other configurations and shapes of the heating chamber 204 may alternatively be used. Thus, the heating chamber 204 may be said to be substantially or generally toroidal in shape as it defines as central passage, aperture or annulus 212 through which the flow duct 203 passes.

Spaced between the distal end of the chimney 202 and the heating chamber 204, a flow exhaust 209 is provided. The flow exhaust 209 is configured to allow fluid to flow out of the heating chamber 204 by convection and, in some embodiments where the fluid is air, to the ambient air surrounding the power generator 201. Thus the flow exhaust 209 is configured to allow heated fluid to exit the power generator 201.

The flow exhaust 209 also comprises a variable flow-restrictor 221 configured to vary the flow rate through the flow exhaust 209 by varying the resistance to the flow through the flow exhaust 209. The exhaust variable flow-restrictor 221 is in this embodiment configured to vary the cross-sectional area of the flow exhaust 209 so as to control the rate of fluid flow flowable through the flow duct 203 and thereby through the generator 201. In the embodiment of FIG. 7, the exhaust variable flow-restrictor 221 comprises one or more panels 221 which are pivotably mounted to the generator 201, for example to the chimney 202 or heating chamber 204, such that pivoting the panels 221 causes the cross-sectional area of the flow exhaust 209 to be varied, although any other suitable means for varying the flow exhaust 209 cross-sectional area may instead be used.

It is not necessary for the power generator 201 to require both the intake variable flow-restrictor 218 as well as the exhaust flow-restrictor 221 in order to control fluid flow through the generator 201—either one, or both, may optionally be provided.

The proximal end of the flow duct 203, that is the end of the flow duct 203 which is opposite to the end fluidly coupled to the flow intake 205, comprises a flow duct outlet 207 which is fluidly coupled to the heating chamber 204 such that fluid from the flow duct 203 may flow into the heating chamber 204. In this embodiment, although it is not essential, the proximal end of the flow duct 203 is configured to arcuately flare radially outwards to form a generally or substantially conical shape. The flow duct outlet 207 comprises a circumferentially extending slot which comprises a plurality of radially spaced strakes 227 configured to segment the flow and to condition it in order to reduce the turbulence of the flow and may optionally be configured to provide laminar flow to the heating chamber 204. The strakes 227 of this embodiment and all other embodiments is entirely optional and non-essential to the invention, but improves the efficiency of the generator 202.

The heating chamber 204 comprises an external wall 208 which is configured to transmit light radiation incident thereon such that fluid within the heating chamber 204 is heated by the transmitted light radiation. The heating chamber 204 therefore defines an internal fluid heating space 231 within which the fluid is heated by the light radiation transmitted by the external wall 208. In this embodiment and in the others described herein, the light radiation may optionally be solar light radiation.

In this embodiment, the external wall 208 is optionally made from plastic sheeting which is optionally supported by a support structure which may optionally comprise ribs such as longitudinally extending ribs 213 and/or laterally extending ribs 214. Equally, glass or other such light transmitting materials may also be used for the external wall 208 instead of the plastic sheeting and which may not require a support structure.

The external wall 208 by virtue of its arcuate shape is configured to substantially focus the light radiation incident on it into the internal fluid heating space 231 within the heating chamber 204. Thereby, the power-generator 201 increases the heating effect of the transmitted light and improves the efficiency of the generator 201. Optionally, to further improve the heating effect and efficiency of the generator 201, the generator 201, for example the external wall 208, may comprise a lens element 211 configured to focus the light radiation transmitted by the external wall 208 within the heating chamber. The lens element 211 may have a focal point or focal locus 232 which is within the heating chamber but is spaced away from all interior surfaces thereof (e.g. spaced away from all light receiving surfaces thereof) such that the focused light radiation directly heats the fluid within the heating chamber, i.e. the fluid within the internal fluid heating space 231 of the heating chamber. Thus, the fluid is heated solely, or at least predominantly, directly by the transmitted light. Optionally, the lens element 211 may be configured to focus the transmitted light radiation to an area, locus or point 232 which is within the heating chamber 204, specifically within the fluid heating space 231 but spaced away from all interior surfaces thereof (including the external wall 208, for example all surfaces which define the fluid heating space 231) such that the focused light radiation directly heats the fluid within the heating chamber 204. In the embodiment of FIG. 7, the arcuate external wall 208 itself is formed of panels which each comprise a lens element 211. Thus, the external wall 208 itself may be configured so as to focus the transmitted light radiation to an area, locus or point 232 which is within the heating chamber 208 but spaced away from all interior surfaces thereof such that the focused light radiation directly heats the fluid within the heating chamber 204. The locus 232 may extend circumferentially around the flow duct 203 within the heating chamber 204 to form a heating zone which is substantially ring-shaped or toroidal.

As in some embodiments the arcuate shape of the external wall 208 itself may form the lens element 211, the external wall 208 may optionally comprise two spaced-apart layers 214, 216 of material. The two layers of material may have an air-gap therebetween to reduce the thermal losses to the environment or the two layers may have a space therebetween which is configured to be filled with water, or another suitable liquid, thereby improving the focusing effect of the lens element 211.

The flow duct 203 comprises a convergent divergent nozzle 217. The convergent divergent nozzle 217 is configured to accelerate the fluid flow within the flow duct 203. An axial turbine 210 is provided at the throat of the nozzle 217, such that it is exposed to the flow within the flow duct 203. Providing the turbine 210 at the throat of the nozzle 217 means that it is provided with accelerated fluid flow as the nozzle 217 accelerates the flow from a speed which may not otherwise be optimal to drive turbine 210. The turbine 210 is operably coupled to an electrical generator 222 such that rotation of the turbine causes the electrical generator 222 to generate electrical power. A shaft forms the operable connection between the turbine 210 and the electrical generator 222, although other suitable operable connections may instead be used.

The operation of the third embodiment of the convection-driven generator is substantially the same as that of the first. As light radiation 28 falls on the external wall 208 of the heating chamber 204, it is transmitted by the external wall 208 and focused by the lens element 211 into the interior fluid heating space 231 of the heating chamber 204 which is filled with fluid to be heated.

The focused light may in some embodiments be focused to a point or a locus 232 which is spaced away from the interior surfaces of the heating chamber 204 such that the transmitted and focused light directly heats the fluid within the heating chamber 2024. Thus the lens element 211 is configured to form a heating zone which is spaced away from the interior walls or surfaces of the heating chamber 204 such that the transmitted and focused light directly heats the fluid within the heating chamber. Thus, the fluid within the heating chamber 204 in some embodiments may not be heated by conduction, or at least not predominately by conduction, e.g. by conduction of heat from an interior surface of the heating chamber 204, but is instead heated at least predominately, and in some embodiments entirely, directly by the transmitted light within the heating zone.

As the fluid within the heating chamber 204 is heated by the transmitted light radiation 28, it begins to rise upwards by convection and escapes the heating chamber 204, and the generator 201, through the flow exhaust 209. The temperature to which the fluid is heated may be controlled by the exhaust variable flow restrictor 221 by controlling the rate at which fluid is able to flow out of the heating chamber 204, therefore how long it is within the fluid heating space 231 and therefore how long it is exposed to the transmitted light radiation 28. Thus, the exhaust variable flow restrictor 221 is pivotable to a position in order to achieve the desired temperature within the heating chamber 204 and thereby the desired fluid flow rate out of the heating camber 204. Once the heated fluid passes through the exhaust variable flow restrictor 221, it is then exhausted to the ambient surroundings.

The escape of heated fluid from the heating chamber 204 causes a reduced pressure in the heating chamber 204 which causes more fluid to be drawn into the heating chamber 204 via flow duct outlet 207, thereby pulling fluid down the flow duct 203 and establishing a fluid current through the flow duct 203. This in turn causes un-heated, ambient air to enter the generator via the flow duct 203 via flow intake 205, the flow rate of the un-heated fluid being controllable via the intake variable flow restrictor 218.

The established fluid current through the flow duct 203 drives rotation of the axial turbine 210 which thus generates electrical power via electrical generator 222 operably coupled to the turbine 210 via a shaft which connects the electrical generator 222 to the turbine 210.

Figure 8:
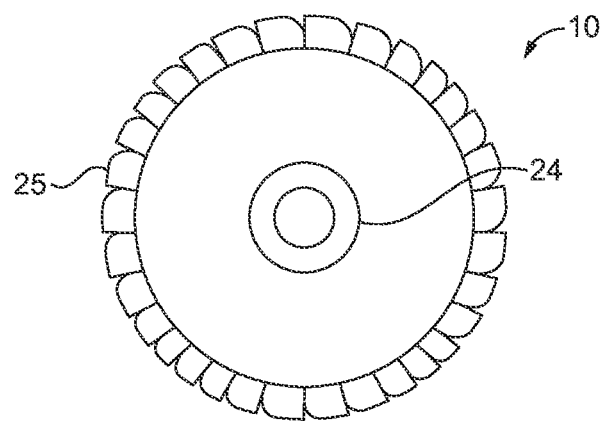
FIGS. 8, 9 and 10 are a top and bottom view and a side cross-sectional view respectively of a preferred embodiment of a turbine according to the present invention.
Figure 9:
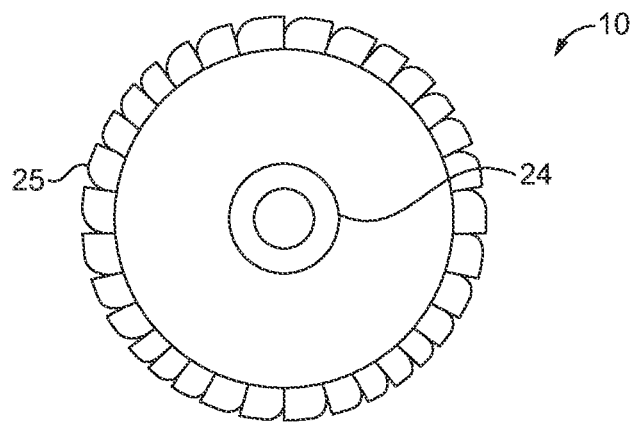

With reference to FIGS. 8 and 9, these figures show the axial turbine of FIG. 10 in top and bottom view respectively and as such show that the turbine has a plurality of turbine blades 25 arranged circumferentially around the turbine. It is these turbine blades 25 which are exposed to the flow within the flow duct 3. As shown in FIG. 10, the turbine blades 25 may comprise a plurality of turbine blade stages, each producing increased flow pressure along the turbine 10, but this is entirely optional. The turbine 10 of FIGS. 8 to 10 is not limited to use in the convection-drive power generator of the present invention but may be used in any scenario requiring a turbine 10 which is capable of operating within a wider range of flow speeds without stalling.

The invention claimed is:

1. A convection-driven power generator comprising:
a flow intake configured to supply fluid to the generator;
a flow duct having a duct inlet and a duct outlet wherein the duct outlet is spaced downstream from the duct inlet along the flow duct, the duct inlet being fluidly coupled to the flow intake;
a heating chamber fluidly coupled to the duct outlet so as to receive fluid from the duct outlet, the heating chamber comprising an external wall configured to transmit light radiation incident thereon such that fluid within the heating chamber is heated by the transmitted light radiation;
a flow exhaust fluidly coupled to the heating chamber and configured to exhaust fluid heated by the heating chamber from the heating chamber;
a turbine arranged within the flow duct, downstream of the flow intake, and exposed to fluid flow through the flow duct such that when fluid flows through the flow duct the turbine is caused to rotate by the fluid flow; and
at least one lens element configured to focus the light radiation transmitted by the external wall within the heating chamber;
wherein the generator is a light-electrical power generator configured to convert incident light radiation into electrical power, and
wherein the heating chamber is an oblate toroid in shape, wherein an annulus of the toroid is arranged along the toroid axis of the heating chamber, and wherein the heating chamber extends circumferentially around the flow duct and the flow duct extends out of the heating chamber.

2. The convection-driven power generator of claim 1, wherein the convection-driven power generator is configured such that, when fluid is heated within the heating chamber by the transmitted light radiation, the heated fluid is caused to flow through the flow exhaust via convection and thereby establishes a fluid current within the flow duct which causes fluid to enter the duct inlet and in turn to enter the generator through the flow intake.

3. The convection-driven power generator of claim 1, wherein the lens element is configured to substantially focus the transmitted light radiation to an area, locus or point which is within the heating chamber but spaced away from all interior surfaces thereof such that the focused light radiation directly heats the fluid with the heating chamber.

4. The convection-driven power generator of claim 1, further comprising a chimney, the chimney comprising at least one of the flow duct or the flow intake.

5. The convection-driven power generator of claim 4, wherein the flow exhaust extends peripherally around the chimney or flow duct.

6. The convection-driven power generator of claim 1, wherein the heating chamber comprises an annulus extending therethrough, and wherein the flow duct, or a portion thereof, passes longitudinally through the annulus.

7. The convection-driven power generator of claim 1, wherein the external wall is made from plastic sheeting supported by a rib support structure.

8. The convection-driven power generator of claim 1, wherein the flow duct comprises a convergent-divergent nozzle for accelerating the fluid flow, the turbine being provided within the nozzle.

9. The convection-driven power generator of claim 1, wherein the flow intake comprises a variable flow restrictor configured to vary the fluid flow rate flowable through the generator.

10. The convection-driven power generator of claim 1, wherein the flow exhaust comprises a variable flow restrictor configured to vary the cross-sectional area of the flow exhaust so as to control the rate of fluid flow flowable through the generator.

11. The convection-drive power generator of claim 10, wherein the flow exhaust variable flow restrictor is pivotably mounted to the generator.

12. The convection-driven power generator of claim 1, wherein the external wall of the heating chamber is configured to transmit solar radiation incident thereon such that fluid within the heating chamber is heated.

13. The convection-driven power generator of claim 1, wherein the turbine is operably connected to an electrical generator such that rotation of the turbine causes the electrical generator to generate electrical power.

14. The convection-driven power generator of claim 1, wherein the flow duct comprises stator blades arranged upstream of the turbine, the stator blades being configured to cause the flow to spiral down the flow duct before it passes through the turbine.

15. The convection-driven power generator of claim 1, wherein the turbine comprises a chamber containing a viscous liquid, wherein the chamber is configured such that the viscous liquid is caused to flow radially outwards within the chamber through centrifugal acceleration of the viscous liquid upon rotation of the turbine.

16. The convection-driven power generator of claim 1, a portion of the flow duct downstream of the turbine arcuately flares radially outwards to form a generally or substantially conical shape, the end of the flared portion comprising the duct outlet being fluidly coupled to the heating chamber.

17. The convection-driven power generator of claim 1, wherein the flow intake is configured to receive fluid from the external environment.

18. The convection-driven power generator of claim 1, wherein the power generator is generally or substantially spherical or spheroid.

* * * * *